(12) United States Patent
Suzuki et al.

(10) Patent No.: US 7,640,822 B2
(45) Date of Patent: Jan. 5, 2010

(54) WORM WHEEL AND WORM GEAR

(75) Inventors: Yasuaki Suzuki, Kariya (JP); Nobuhiko Takeda, Okazaki (JP); Kouji Hirao, Chiryu (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 217 days.

(21) Appl. No.: 11/762,417

(22) Filed: Jun. 13, 2007

(65) Prior Publication Data

US 2007/0295129 A1    Dec. 27, 2007

(30) Foreign Application Priority Data

Jun. 27, 2006    (JP)    ............... 2006-176515

(51) Int. Cl.
 *F16H 55/22*    (2006.01)
(52) U.S. Cl. ............... 74/458; 74/425; 74/457
(58) Field of Classification Search ............... 74/425, 74/457, 458, 462; 464/73
See application file for complete search history.

(56) References Cited

U.S. PATENT DOCUMENTS 6,354,395 B1 *    3/2002    Cheng et al. ............... 180/444

2002/0046897 A1 *    4/2002    Kurokawa et al. ............... 180/444
2005/0115343 A1 *    6/2005    Sakamaki ............... 74/89.23
2005/0269478 A1 *    12/2005    Woehrle et al. ............... 248/430
2006/0213302 A1    9/2006    Hoffmann et al.

FOREIGN PATENT DOCUMENTS

| | | |
|---|---|---|
| DE | 10 2004 013 009 A1 | 10/2005 |
| JP | 2002-310267 | 10/2002 |
| JP | 2003-160052 | 6/2003 |
| WO | WO 2005-015054 A1 | 2/2005 |

* cited by examiner

*Primary Examiner*—Richard W L Ridley
*Assistant Examiner*—Terence Boes
(74) *Attorney, Agent, or Firm*—Oblon, Spivak, McClelland, Maier & Neustadt, L.L.P.

(57) ABSTRACT

A resin worm wheel is formed by injection molding and includes a first end and a second end. The worm wheel is adapted to be driven by a worm. The worm wheel further includes: an engaging portion including a plurality of teeth engageable with the worm and a tooth space formed between the neighboring teeth; a first non-engaging portion adjacent to the engaging portion at the first end of the worm wheel and not engaging with the worm; and a first cutout portion formed at the first non-engaging portion continuously from the tooth space, the first cutout portion extending axially.

6 Claims, 3 Drawing Sheets

WORM WHEEL AND WORM GEAR

CROSS REFERENCE TO RELATED APPLICATIONS

This application is based on and claims priority under 35 U.S.C. § 119 to Japanese Patent Application 2006-176515, filed on Jun. 27, 2006, the entire content of which is incorporated herein by reference.

FIELD OF THE INVENTION

This invention relates to a resin-made worm wheel driven by a worm and a worm gear (worm speed reducer) having the same.

BACKGROUND

A known worm wheel is disclosed in JP2002-310267A (hereinafter, refers to as a reference. The worm wheel is formed with resin and driven by a worm. The worm wheel is provided with: an engaging portion having a plurality of teeth engaged with the worm; and tooth spaces defined between the neighboring teeth and of which bottom surface is recessed radially inwardly. The worm wheel is structured by integrating two members divided perpendicularly to the axis thereof.

Generally at a resin molding with a die, undercut is formed by tooth spaces when the bottom surfaces of each tooth space is recessed radially inwardly. If the amount of the undercut is large, it may be difficult to die-cut the worm wheel after molding the worm wheel in the die, which structures the worm wheel disclosed in this reference with two members.

The worm wheel disclosed in the reference needs to be structured by resin-molding two members separately and by bonding the two members perpendicularly along the axis direction, thus leading to an inevitable increase of man-hours to connect two members.

As a worm wheel, which is not established with plural divided members, a resin base material of the worm wheel can be formed with toothed portions at a peripheral portion by cutting. However, the cutting work is not cost efficient and a certain improvement is considered to be necessary for this method from the viewpoint of productivity.

The present invention has been made in view of the above circumstances and provides a resin worm wheel manufactured with improved productivity.

SUMMARY OF THE INVENTION

According to an aspect of the present invention, a resin worm wheel is formed by injection molding and includes a first end and a second end. The worm wheel is adapted to be driven by a worm. The worm wheel further includes: an engaging portion including a plurality of teeth engageable with the worm and a tooth space formed between the neighboring teeth; a first non-engaging portion adjacent to the engaging portion at the first end of the worm wheel and not engaging with the worm; and a first cutout portion formed at the first non-engaging portion continuously from the tooth space. The first cutout portion extends axially.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Embodiments of the present invention will be descried below with reference to the attached drawing figures.

Figure 1:
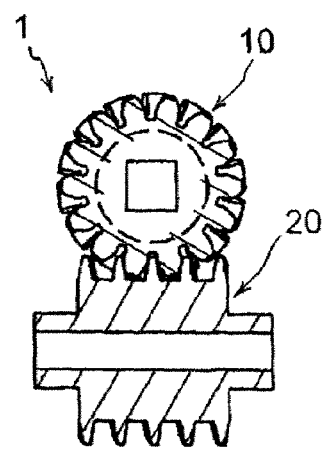
FIG. 1 is a schematic view of a worm gear a having a worm wheel according to an embodiment of the present invention.

FIG. 1 is a view illustrating a worm gear 1, which serves as a worm speed reducer, including a worm wheel 10 related to a first embodiment of the present invention. The worm gear 1 includes the worm wheel 10 and a worm 20. The worm wheel 10 is engaged with the worm 20 and is driven thereby. The worm wheel 10 includes a first end 9 and a second end 19 in an axial direction thereof.

Figure 2:
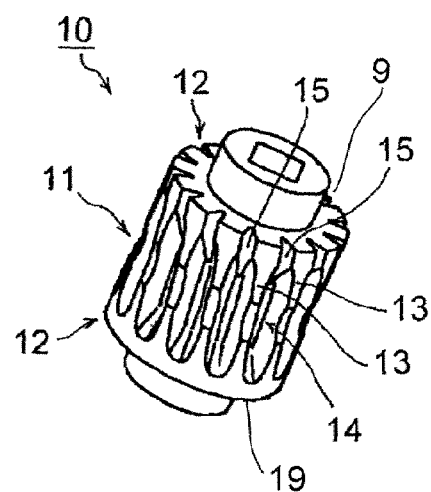
FIG. 2 is a perspective view of the worm wheel.
Figure 3:
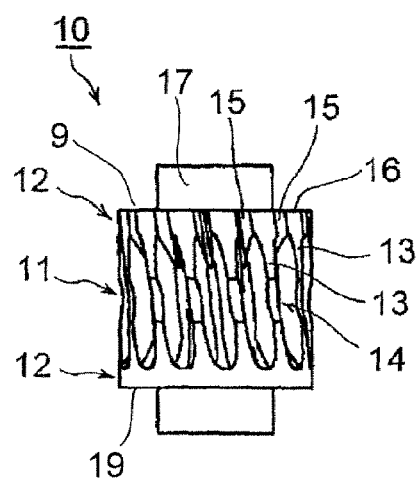
FIG. 3 is a front view of the worm wheel.

FIG. 2 is a perspective view of the worm wheel 10 and FIG. 3 is a front view of the worm wheel 10. The entire body of the worm wheel 10 is formed in one operation by injection molding. The worm wheel 10 is provided with an engaging portion 11 and non-engaging portion 12 which serve as a first non-engaging portion and a second non-engaging portion. The engaging portion 11 is formed at the axially middle portion of the worm wheel 10, i.e., in an up and down direction in FIG. 3. The engaging portion 11 is formed with a plurality of teeth 13 that engage with the worm 20. Here, the engaging portion 11 represents a portion of the worm wheel 10 mating with the worm 20. Additionally, tooth spaces 14 are provided at the axially middle portion of the engaging portion 11. Each tooth space 14 is formed between the neighboring teeth 13 and exhibits a recessed shape. The tooth spaces 14 are only partially attached with reference numerals in the drawing figures. As illustrated in the drawings, the middle portion of the each tooth space is deep and becomes shallower as approaching to an end of the worm wheel 10. The non-engaging portions 12 are formed at both ends of the worm wheel 10 so as to adjoin the engaging portion 11. The non-engaging portions 12 do not engage with the worm 20 and do not come in contact therewith. According to the embodiment, the non-engaging portion 12 is formed with a plurality of cutout portions 15 (a first cutout portion and a second cutout portion, the cutout portions 15 are only partially attached with reference numerals in FIGS. 2 and 3). Each cutout portion 15 is continuously formed through an end of the tooth spaces 14 and extends to an end surface 16 of the worm wheel 10. According to the embodiment of the present invention, the cutout portion 15 has a circumferential length smaller than the one of the tooth space 14. Further, the cutout portion 15 can be shaped in any ways as far as the cutout portion 15 is less undercut and a rigidity of the worm wheel 10 is not damaged.

Figure 4:
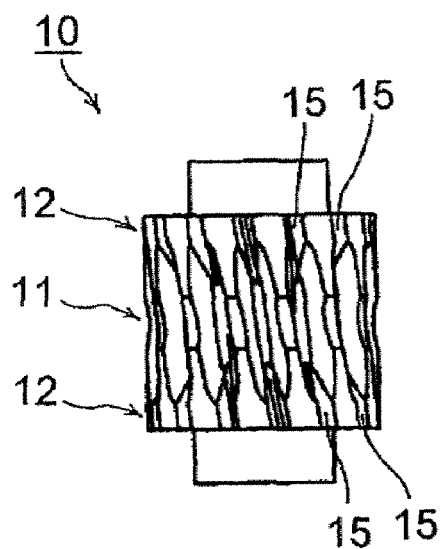
FIG. 4 is a view of a worm wheel according to another embodiment.

In the embodiment shown in the FIG. 2 and FIG. 3, the cutout portions 15 are provided at one of the non-engaging portions 12 provided at both ends of the worm wheel 10. However, as illustrated in FIG. 4, the cutout portions 15 can be provided at both of the non-engaging portions 12 provided at both ends of the worm wheel 10.

Figure 5:
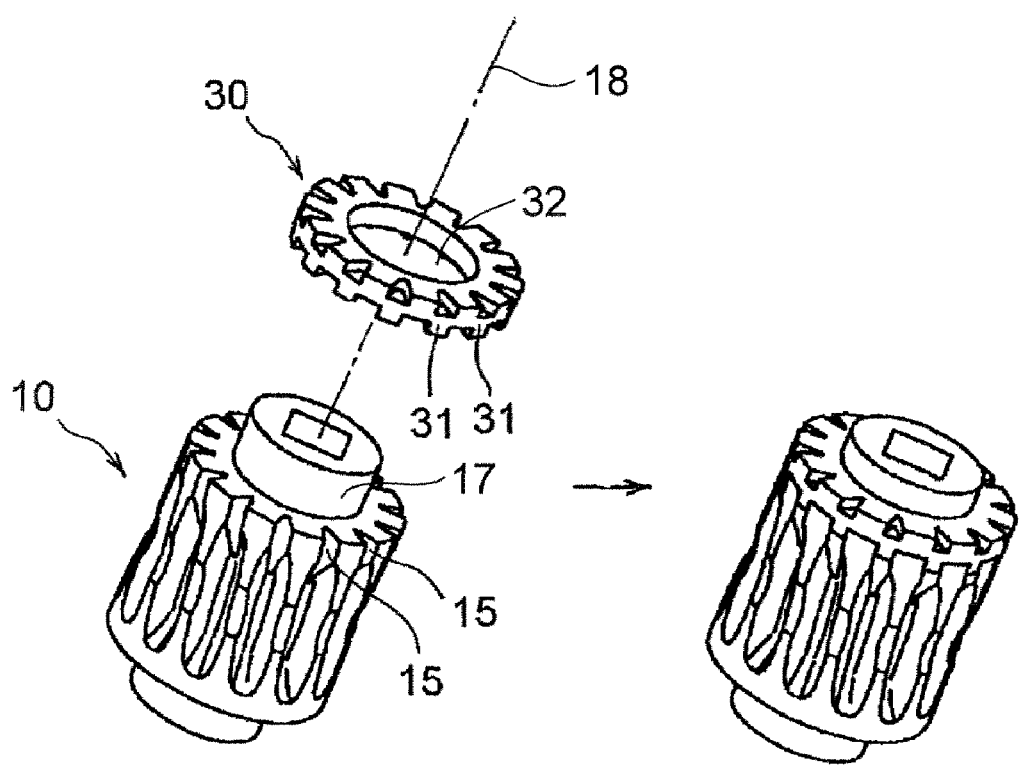
FIG. 5 is a view of a reinforcement member.

In the embodiment shown in the FIG. 5, the worm wheel 10 includes a ring-shaped reinforcement member 30 (a first ring-shaped reinforcement member and a second ring-shaped reinforcement member). The reinforcement member 30 is formed with insertion portions 31, which are adjusted to be inserted into the cutout portions 15 respectively and are attached to an end surface of the worm wheel 10. The cutout portions 15 are equally spaced in the circumferential direction of the worm wheel 10.

It is preferable that the insertion portions 31 protrude at one surface of the ring-shaped reinforcement member 30.

Figure 6:
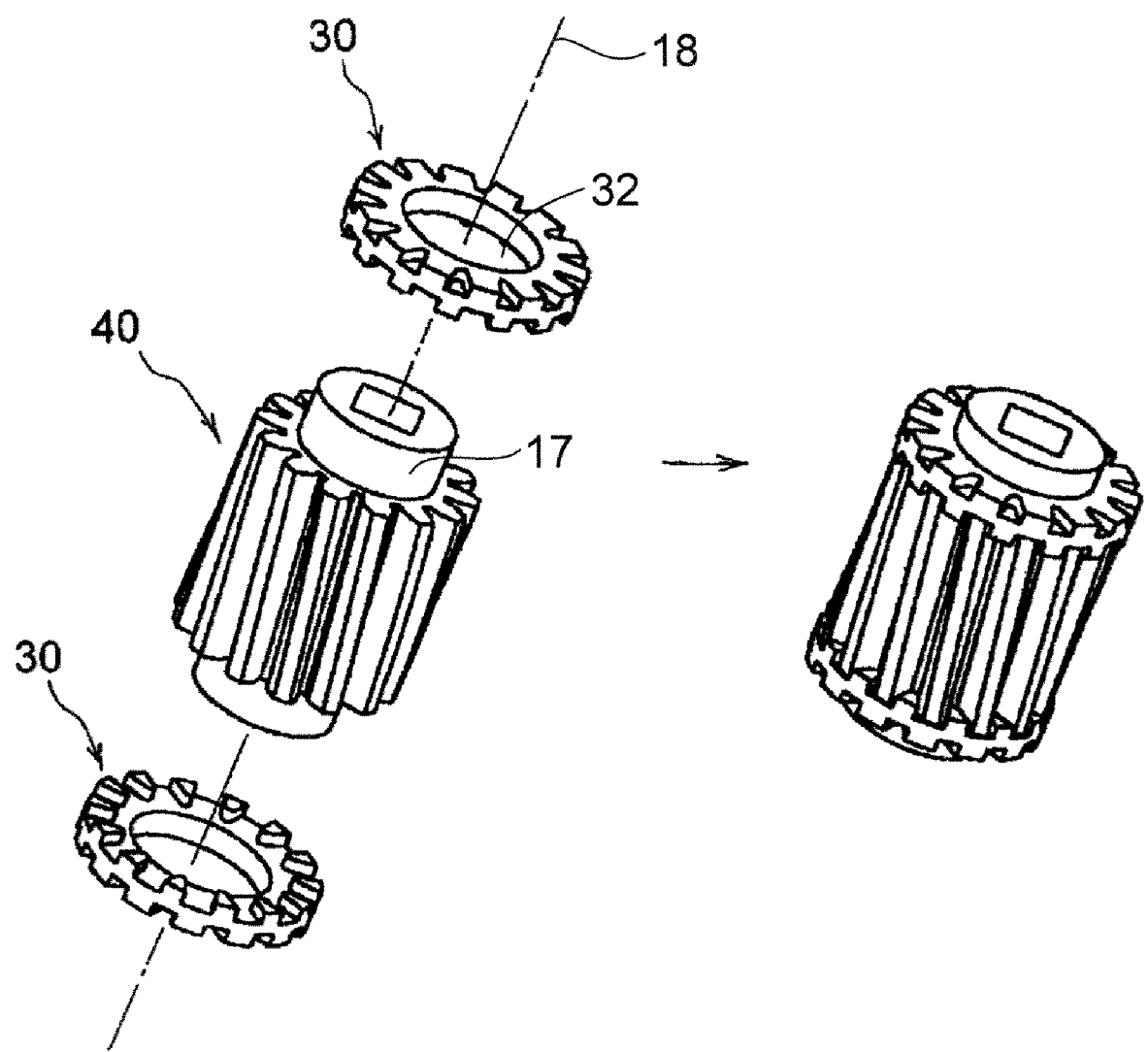
FIG. 6 is a view of another embodiment of the reinforcement member.

The reinforcement member 30 is formed separately from the worm wheel 10 by injection molding. The reinforcement member 30 is ring-shaped, having a hole 32 at the center thereof, and is provided with the insertion portions 31 that are equally spaced in the circumferential direction (the insertion portion 31 are only partially attached with reference numerals in FIG. 5). As shown in FIG. 5, the insertion portions 31 are inserted into the cutout portions 15 of the worm wheel 10 in a situation where boss portions 17, which are formed at both ends of the worm wheel along an axis 18, are inserted into the holes 32. As aforementioned, the reinforcement member 30 can improve strength of the worm wheel 10 by the insertion portions 31 inserted into the cutout portions 15 of the worm wheel 10. The reinforcement member 30 can be applied to both ends of a helical gear 40 as shown in FIG. 6. The reinforcement member 30 can be made from resin or metal material.

As an embodiment of present invention, the worm gear 1 can include a helical gear 40 instead of the worm wheel 10 as described above.

As described above, the worm wheel 10 and the worm wheel 10 configuring the worm gear 1 according to the embodiment, each includes cutout portions, which are provided at the non-engaging portions 12 and are formed continuously through the tooth spaces 14 extending to the axial direction of the worm wheel 10. With this structure, the amount of the undercut will be reduced and it can be easier to die-cut the worm wheel 10 after resin molding. Accordingly, according to the embodiment, the worm wheel 10 does not include a block configuration and is entirely formed by thereof is formed by resin molding, which enhances productivity of the worm wheel 10 (worm gear 1).

It is preferable that the first cutout portion extends into an end surface of the first end of the worm wheel.

It is further preferable that the resin worm wheel further includes a second non-engaging portion adjacent to the engaging portion at the second end of the worm wheel and not engaging with the worm. The first cutout portion is formed at the first non-engaging portion and a second cutout portion is formed at the second non-engaging portion.

It is still further preferable that the worm wheel further includes a first ring-shaped reinforcement member having at least one insertion portion fitted into the first cutout portion and attached to the end of the worm wheel.

It is preferable that the insertion portion of the first ring-shaped reinforcement member includes multiple protrusions provided at one surface of the first ring-shaped reinforcement member.

It is still further preferable that the worm wheel and the worm structures a worm gear.

As described above, the worm wheel and the worm wheel configuring the worm gear is each provided with the non-engaging portion. The worm wheel is formed with cutout portions formed continuously from the tooth space and extending axially. In such structure, because the amount of undercut by the tooth space is reduced, the worm wheel is easily die-cut from a die. As a result, the entire body of the worm wheel is formed in one operation by injection molding, which leads to an improvement in productivity of the worm wheel.

The principles, of the preferred embodiment and mode of operation of the present invention have been described in the foregoing specification. However, the invention, which is intended to be protected, is not to be construed as limited to the particular embodiment disclosed. Further, the embodiment described herein are to be regarded as illustrative rather than restrictive. Variations and changes may be made by others, and equivalents employed, without departing from the spirit of the present invention. Accordingly, it is expressly intended that all such variations, changes and equivalents that fall within the spirit and scope of the present invention as defined in the claims, be embraced thereby.

The invention claimed is:

1. A one-piece resin worm wheel formed by injection molding, having first and second ends at opposite ends thereof, and adapted to be driven by a worm, comprising:
   an engaging portion including a plurality of teeth engageable with the worm and a tooth space disposed between the neighboring teeth;
   a first non-engaging portion provided between the engaging portion and the first end of the worm wheel and that remains out of engagement with the worm;
   a first cutout portion disposed on an outer surface of the first non-engaging portion such that one end of the first cutout portion connects to the tooth space and the other end of the first cutout portion opens outwardly from the first end;
   a second non-engaging portion provided between the engaging portion and the second end of the worm wheel and that remains out of engagement with the worm; and
   a second cutout portion disposed on an outer surface of the second non-engaging portion such that one end of the second cutout portion connects to the tooth space and the other end of second cutout portion opens outwardly from the second end,
   wherein each of the first and second cutouts is smaller than the tooth space in width.

2. The resin worm wheel according to claim 1, wherein the tooth space has a bottom, a middle portion of which is the deepest portion of the tooth space and makes a slant inclination relative to each of the first and second ends.

3. A worm gear transmission device, comprising:
   a worm; and
   a one-piece resin worm wheel formed by injection molding, including first and second ends at opposite ends thereof, and adapted to be driven by the worm,
   the one-piece resin worm wheel comprising:
   an engaging portion including a plurality of teeth engageable with the worm and a tooth space disposed between the neighboring teeth;
   a first non-engaging portion provided between the engaging portion and the first end of the worm wheel and that remains out of engagement with the worm;
   a first cutout portion disposed on an outer surface of the first non-engaging portion such that one end of the first cutout portion connects to the tooth space and the other end of the first cutout portion opens outwardly from the first end;
   a second non-engaging portion provided between the engaging portion and the second end of the worm wheel and that remains out of engagement with the worm; and
   a second cutout portion disposed on an outer surface of the second non-engaging portion such that one end of the second cutout portion connects to the tooth space and the other end of second cutout portion opens outwardly from the second end,
   wherein each of the first and second cutouts is smaller than the tooth space in width.

4. The worm gear transmission device according to claim 3, wherein the tooth space has a bottom, a middle portion of which is the deepest portion of the tooth space and makes a slant inclination relative to each of the first and second ends.

5. A resin worm wheel formed by injection molding and adapted to be driven by a worm, comprising:
- a one-piece main body having first and second ends at opposite ends thereof;
- an engaging portion provided on the one-piece main body, the engaging portion including a plurality of teeth engageable with the worm and a tooth space disposed between the neighboring teeth of the plurality of teeth;
- a first non-engaging portion provided between the engaging portion and the first end of the main body and that remains out of engagement with the worm;
- a first cutout portion disposed on an outer surface of the first non-engaging portion such that one end of the first cutout portion connects to the tooth space and the other end of the first cutout portion opens outwardly from the first end of the main body;
- a second non-engaging portion provided between the engaging portion and the second end of the main body and that remains out of engagement with the worm; and
- a second cutout portion disposed on an outer surface of the second non-engaging portion such that one end of the second cutout portion connects to the tooth space and the other end of second cutout portion opens outwardly from the second end of the main body,
- wherein each of the first and second cutouts is smaller than the tooth space in width.

6. The resin worm wheel device according to claim 5, wherein the tooth space includes a bottom. a middle portion of which is the deepest and makes a slant inclination relative to each of the first and second ends.

* * * * *